United States Patent Office 3,356,639
Patented Dec. 5, 1967

3,356,639
STABILIZATION OF POLYOLEFINES WITH PHOSPHORUS HALIDES AND PEROXIDES
Gerhard Meyer, Obernburg, Erhard Siggel, Seckmauern uber Hochst, Odenwald, Albert Schöpf, Hering uber Hochst, Odenwald, and Helmut Mägerlein, Erlenbach, Germany, assignors to Vereinigte Glanzstoff-Fabriken AG., Wuppertal-Elberfeld, Germany
No Drawing. Filed Jan. 26, 1965, Ser. No. 428,239
Claims priority, application Germany, Jan. 31, 1964, V 25,296
17 Claims. (Cl. 260—45.7)

ABSTRACT OF THE DISCLOSURE

Stabilizing a high molecular weight poly-α-monoolefine such as polypropylene against oxidation by heating it in finely divided form dispersed in an inert hydrocarbon containing a small amount of (A) a phosphorous compound selected from $POCl_3$, $PCl_3$, $PCl_2R$ and $PClR_1R_2$ wherein the R's represent hydrocarbon substituents and (B) an organic peroxide. Examples of the hydrocarbon substituted phosphorous compounds are lauryl-$PCl_2$, dilauryl-PCl or diphenyl-PCl. An example of the organic peroxide is di-tert.-butyl-peroxide. The resulting stabilizer poly-α-monoolefine is useful in producing filaments, films and molded articles resistant to oxidation.

This invention is concerned with a process for treatment of high molecular weight polyolefines so as to improve their stability against oxidation. More particularly, the invention relates to a method of contacting a polyolefine with a specific treating agent under conditions which are sufficient to enhance the oxidation-resistance of the resulting polyolefine product.

It is known that valuable products in the form of filaments, films, foils or other extruded or molded articles can be produced from polyolefines obtained by the addition polymerization of monomeric olefines, such as the alpha-monoolefines of from 2 up to about 10 carbon atoms. Especially favorable properties are exhibited by solid high molecular weight polyolefines which have been obtained by the so-called low pressure polymerization process requiring the use of a stereospecific catalyst or the so-called Ziegler catalysts. Although such polyolefines have advantageous properties such as high strength, high density, relatively higher melting points and general resistance to chemical attack, they exhibit a somewhat limited stability against attack by oxygen, especially where there is simultaneous application of heat and/or exposure to ultraviolet rays. The damage shown by polyolefines under such oxidation conditions has been attributed to the presence of double bonds in or on the molecular chain of the polymer, these double bonds or olefinically unsaturated portions of the molecule being particularly susceptible to attack by oxygen. It does not appear to be possible to prevent or avoid the occurrence of these double bonds by any special precautions during polymerization. Therefore, in order to improve the stability of the polyolefine, it is apparently necessary to subject the polymer to an after-treatment which will tend to saturate the double bonds.

For example, it has been suggested that the polymer be subjected to a treatment with certain silicon compounds in which at least one hydrogen atom is attached directly to the silicon atom. In this known process, the polyolefine must be dissolved in a solvent and stirred for a relatively long period of time together with the silicon compound and a suitable catalyst. Aside from the fact that this process requires the use of considerable amounts of solvents and precipitation agents, it is unusually expensive because a thorough purification must be carried out after the treatment with the silicon compound and precipitation of the treated polymer from its solution.

According to an alternative of this known process, the stabilizing treatment can also be carried out by mixing the polyolefine with the silicon compound in an extruder at elevated temperatures, e.g. 250–300° C. However, a uniform stabilization is not obtained in this manner. Furthermore, this process suffers from the disadvantage that the silicon compound remains in the polymer.

In another known process, hydrogenation of the double bonds has been attempted in order to solve the problem of stabilization. The polyolefine in the form of a solution, emulsion or suspension is conducted through a suitable hydrogenation reaction vessel where it is brought into contact with a specific hydrogenation catalyst. This process requires a considerable expenditure in apparatus and time and is not suitable for treating large amounts of polyolefines. Finally, this method is disadvantageous in that the treated polyolefine must be subjected to additional steps for removal of the heterogeneous hydrogenation catalyst which would otherwise cause trouble in the normal processing of the polyolefine into finished articles.

The primary object of the present invention is to provide a process of treating a polyolefine which will lead to an improved product exhibiting better resistance to oxidation and aging, especially such oxidation as may occur in normal use of the polymer where it is exposed to heat and light.

Another object of the invention is to improve the stability of polyolefines against oxidation by a process or method which can be carried out in an economical manner and under easily controlled conditions.

Yet another object of the invention is to provide a process for improving the stability of polyolefines whereby conventional apparatus can be employed and the necessary steps can be readily combined with conventional polymerization processes for the production and separation of a substantially pure polyolefine.

Still another object is to improve the polyolefine stability by a process which permits the treatment of large quantities of the polymer on a commercial scale.

These and other objects and advantages of the invention will become more apparent after considering the following detailed specification.

It has now been found, in accordance with the present invention, that an improved polyolefine product can be obtained by dispersing the polyolefine as a finely divided powder in an inert hydrocarbon containing a small amount of a phosphorous compound selected from the group consisting of $POCl_3$, $PCl_3$, $PCl_2R$ and $PClR_1R_2$ wherein R, $R_1$ and $R_2$ are substituents representing alkyl, aryl, aralkyl or cycloalkyl of from 1 to 18 carbon atoms, and also containing a small amount of an organic peroxide. The actual treatment is carried out by heating this dispersion with mixing or agitation at a temperature from about 50° C. up to the boiling point of the inert hydrocarbon liquid, e.g. from about 50° C. up to about 150° C. and preferably about 60°–120° C., for a period of time sufficient to enhance the oxidation-resistance of the polyolefine. The polyolefine is then separated from the dispersion, for example by filtration, and is then preferably washed two or more times with the inert hydrocarbon liquid and finally dried by evaporation or distilling off any adherent hydrocarbon liquid.

The process of the present invention is particularly advantageous for the treatment of poly-alpha-monoolefines of from 2 up to about 8 carbon atoms in the monomeric alphamonoolefine, and especially good results have been achieved with the treatment of the polyolefines of the 3 to 6 carbon atom monomers, e.g. polypropylene, polybutylene or poly-4-methylpentene-1. The results are also quite significant where the treatment is applied to stereoregulated or isotactic polyolefines as obtained by polymerization of the olefine under low pressure conditions in the presence of particular catalyst systems commonly referred to as stereospecific catalysts. These catalyst systems are well known in this art as well as the polymerization conditions and methods of recovering the isotactic polymer porduct, the preferred Ziegler catalyst contains $TiCl_3$ in combination with a trialkyl aluminum, e.g. triethyl aluminum.

The process of the invention is most conveniently carried out after the polyolefine has been purified, i.e. after polymerization has taken place and the polymer has been purified by removing and recovering the catalyst components therefrom. In the case of Ziegler type catalysts which are acid-soluble, the polymerization product is extracted with alcoholic-HCl, e.g. weak HCl in methanol, and the polymer is then washed and/or neutralized for substantially complete removal of the extractant and catalyst components. At this point, the purified polyolefine is in the form of a finely divided powder which can be readily subjected to the stabilizing treatment of the invention. Furthermore, the preceding steps are carried out in conventional apparatus with the substantial exclusion of oxygen and water, and the purified polyolefine can then be treated in the same apparatus under the same conditions of an oxygen-free and moisture-free environment, thereby avoiding any procedural complications in the overall process.

The purified polyolefine powder is normally obtained in conventional polymerization processes in a particle size which is quite suitable for the stabilizing treatment of the invention within a reasonable period of time. Smaller particles can usually be treated at lower temperatures and/or shorter periods of time. In general, it is desirable to use particle sizes of about 0.1 m$\mu$ to 500 m$\mu$.

The phosphorous compound employed as the treating agent can be added to the inert hydrocarbon dispersing liquid in quite small amounts of at least 0.01% by weight, preferably about 0.1 to 1% by weight, with reference to the total amount of the polyolefine. Somewhat higher mounts, e.g. up to 2% or even 5% by weight (with reference to the polyolefine), can also be employed but without any special advantage.

Suitable phosphorous compounds are those in which the phosphorous has a valency of 3 to 5, corresponding to the formulae set forth hereinabove. In addition to $PCl_3$ and $POCl_3$, it is also possible to use trivalent phosphorous mono- and di-chlorides which carry 1 or 2 hydrocarbon radicals, e.g. alkyl of 1 to 18 carbon atoms and preferably 1 to 12 carbon atoms, cycloalkyl of preferably 5 to 8 carbon atoms, aryl such as phenyl or naphthyl or their lower alkyl-substituted derivatives or aralkyl such as benzyl. Thus, besides phosphorous trichloride and phosphorous oxychloride, the following compounds are also suitable: diphenyl phosphorous chloride, lauryl phosphorous dichloride, dilauryl phosphorous chloride, benzyl phosphorous dichloride, cyclohexyl phosphorous dichloride, methyl phosphorous dichloride, dimethyl phosphorous chloride, ethyl phosphorous dichloride, diethyl phosphorous chloride, butyl phosphorous dichloride, dibutyl phosphorous chloride, hexyl phosphorous dichloride, dihexyl phosphorous chloride, octyl phosphorous dichloride, dioctyl phosphorous chloride, dicyclohexyl phosphorous chloride, dibenzyl phosphorous chloride, benzyl phosphorous dichloride, phenyl phosphorous dichloride, tolyl phosphorous dichloride, ditolyl phosphorous chloride, $\alpha$-naphthyl phosphorous dichloride, di-$\alpha$-naphthyl phosphorous chloride.

The organic peroxide is used in even smaller amounts of at least 0.001%, preferably 0.01 to 0.1% by weight, with reference to the polyolefine, and generally not more than 1% by weight. Preferred organic peroxides are as follows: dialkyl-peroxides such as di-tert.-butyl peroxide; diacyl-peroxide, such as dibenzoyl peroxide, diacetyl peroxide or dilauroyl peroxide; ketone peroxides, such as cyclohexanone peroxide or methylethylketone peroxide; and other organic peroxides such as dicumyl peroxide, tert.-butylperacetate or tert.-butylperbenzoate. In this connection, it should be noted that in using a stable peroxide, e.g. di-tert.-butyl peroxide, the treatment must be carried out at proportionately higher temperatures and/or continued for a longer period of time. Very unstable peroxides, such as methylethyleneperoxide act more rapidly and can also be used at temperatures which lie in the lower end of the temperature range. Still other suitable organic peroxides include the following: di-t-amyl peroxide, 2,2-bis-(t-butylperoxide)-butane, cumene hydroperoxide, t-butylhydroperoxide, cyclohexyl hydroperoxide, methylcyclohexyl hydroperoxide, p-menthane hydroperoxide, methylamylketone peroxide, acetyl benzoyl peroxide, disuccinyl peroxide, 2,4-dichlorobenzoyl peroxide, dicaproyl peroxide, di-t-butyl perphthalate, peracetic acid, discumene peroxide.

As dispersing agents, any of the following inert hydrocarbon liquids can be employed: pentane, hexane, heptane, benzine, benzene, toluene, xylene, decalin, tetralin and/or diesel oil. It is possible to use mixtures of these inert hydrocarbon liquids or to use a different liquid for washing than is used during the treatment itself, but it is generally more convenient to use just one liquid for all of the process steps.

It is preferable to employ a liquid hydrocarbon as the dispersing agent which is easily volatilized because it is then much easier to separate and recover the hydrocarbon liquid after the stabilization treatment is completed. For example, hydrocarbon liquids boiling below about 100° C. are especially useful.

It will be obvious that the temperatures and periods of time for any specific treatment will depend on a number of different factors. At higher temperatures, the treatment can generally be terminated more quickly. Also, if a shorter treatment period is desired, it is possible to work under elevated pressure in a closed vessel at temperatures which extend up to the boiling point of the hydrocarbon dispersing agent at the pressure being considered. Thus, by working under pressure, low-boiling hydrocarbon liquids can be used at much higher temperatures to obtain correspondingly shorter periods of treatment. In general, the process of the invention is best carried out with treatment periods of about 30 minutes to 5 hours at temperatures of about 60° C. to 120° C.

By comparison with previously known stabilizing methods, the process of the present invention offers the advantage that it can be carried out directly in conjunction with the purification of the polymer without interfering with the normal polymerization or the separation and recovery of the polymerization catalyst and purified polymer. All of the dispersing agents suitable for the stabilizing process are also solvents which have been found to be useful in the purification process. The excess dispersing liquid can be separated by filtration or centrifuging, and the polymer is easily purified to remove substantially all of the treating agents by a simple washing with the inert hydrocarbon liquid. Thus, it is possible to avoid a special purification as is required in known methods which use a heterogenous catalyst for the stabilizing treatment. A much more uniform and extensive stabilizing is obtained by contacting the polyolefine powder with the compounds contained in the dispersing agent according to the invention than is possible by incorporating or engraining a stabilizing agent into the polymer.

The process of the invention is further illustrated but not limited by the following examples.

*Examples 1–9*

In a 1-liter two-necked flask equipped with an agitator and reflux condenser, 100 grams of polypropylene or poly-4-methylpentene-1 were dispersed in 600 ml. of a suitable hydrocarbon dispersing agent under a nitrogen atmosphere (see the table below for the details of each example). The polymers were produced by polymerization of propylene or 4-methylpentene-1 in the presence of aluminum triethyl and $TiCl_3$ as a stereospecific catalyst. After completion of the polymerization, the polymer was purified with hexane and with methanol in admixture with hydrochloric acid, washed neutral and then dried. A particular treating agent as well as a peroxide were added to this dispersion, and the dispersion was then heated with mixing for the period of time and at the temperatures shown in the table. The dispersing agent was then filtered off, the polymer powder washed twice thereafter with 100 ml. dispersing agent each time and finally dried under nitrogen in a vacuum drying chamber. The stability of the dry sample against oxidation was then determined.

peroxide, methylamylketone peroxide, diacetyl peroxide, acetyl benzoyl peroxide, dilauroyl peroxide, disuccinyl peroxide, 2,4-dichlorobenzoyl peroxide, dicaproyl peroxide, di-t-butyl perphthalate, t-butyl permaleic acid, isoproyl percarbonate, peracetic acid, dibutyryl peroxide, t-butyl peracetate, hydroxyheptyl peroxide, 1-hydroxycyclohexyl hydroperoxide-1, dibenzaldiperoxide and or dispersing agents such as pentane, octane, isooctane, cyclohexane, benzine, benzene, toluene, xylene, Decalin, tetralin and diesel oil.

The invention is hereby claimed as follows:

1. A process for improving the stability of a high molecular weight poly-α-monoolefine which comprises: dispersing said poly-α-monoolefine as a finely divided powder in an inert hydrocarbon containing 0.01 to 5% by weight with reference to the polymonoolefin each of

TABLE

| No. | Treating agent | Percent by Weight [1] | Dispersing Agent | Peroxide | Percent by Weight [1] | Treatment Period, hours | Temp., °C. | Stability, minutes |
|---|---|---|---|---|---|---|---|---|
| 1 | $PCl_3$ | 1 | Heptane | Dibenzoyl | 0.1 | 4.5 | 98 | 105 |
| 2 | Lauryl-$PCl_2$ | 1 | do | do | | 5 | 98 | 100 |
| 3 | $POCl_3$ | 1 | do | do | | 4 | 98 | 91 |
| 4 | Dilauryl-PCl | 1 | Hexane | Methylethylketone | 0.1 | 5.5 | 60 | 85 |
| 5 | Diphenyl-PCl | 0.5 | Ligroin, B.P. 110–130° | Di-tert.-butyl | 0.05 | 5 | 110 | 97 |
| 6 | Benzyl-$PCl_2$ | 0.75 | Benzene | Di-cumyl | 0.08 | 4 | 80 | 102 |
| 7 | | | Heptane | Dibenzoyl | 0.1 | 4.5 | 98 | 58 |
| 8 | $PCl_3$ | 1 | do | Di-tert.-butyl | 0.1 | 4 | 98 | 12 |
| 9 | | | do | Di-tert.-butyl | 0.1 | 4 | 98 | 3 |

[1] Percent by weight, in each instance, with reference to the amount of polyolefine.

Examples 1–7 of this table relate to the treatment of polypropylene, whereas Examples 8 and 9 involve the treament of poly-4-methylpentene-1 which was otherwise obtained and treated in the same manner as polypropylene. Examples 7 and 9 were carried out as control experiments by omitting the phosphorous compound as the treating agent.

For determination of the stability of the treated polyolefine in the foregoing examples, 30 grams of the polymer powder were ground in a ball mill for a period of 30 minutes with a stabilizing mixture of 0.03 grams dilaurylthiodipropionate and 0.03 grams of 4,4'-thio-bis-(3-methyl-6-t-butyl-phenol), i.e. 0.1% by weight in each case. 12 grams of this mixture were pressed in a plate press at 170° C. and under a pressure of 350 atm. into a 1 mm. thick plate. The plate was cut into strips 3–4 mm. wide and 30–40 mm. long from which 3 grams were introduced into a test tube standing in an aluminum block maintained at 200±1.5° C. and connected to an oxygen burette. By controlling the volume of oxygen, the time in minutes was determined for the spontaneous absorption of oxygen to begin. This induction period for the oxidation of the polymer at 200° C. in pure oxygen serves as a measure of the stability at room temperature. In the case of poly-4-methylpentene(1), the measurement was carried out at 230° C. and the oxygen was introduced into the stabilized, unpressed powder contained in the test tube.

Similar results can be achieved under conditions corresponding to the preceding examples by treating the polyolefins with phosphorus compounds such as methyl phosphorous dichloride, dimethyl phosphorus chloride, ethyl phosphorous dichloride, diethyl phosphorous chloride, butyl phosphorous dichloride, dibutyl phosphorous chloride, hexyl phosphorous dichloride, dihexyl phosphorous chloride, octyl phosphorous dichloride, dioctyl phosphorous chloride, cyclohexyl phosphorus dichloride, dicyclohexyl phosphorus chloride, dibenzyl, phosphorous chloride, phenyl phosphorous dichloride, tolyl phosphorous dichloride, ditolyl phosphorous chloride, -naphthyl phosphorous dichloride, di- -naphthyl phosphorous chloride and or organic peroxides such as di-t-amyl-peroxide, 2,2-bis-(t-butylperoxide)-butane, cumene hydroperoxide, t-butyl hydroperoxide, cyclohexyl hydroperoxide, methylcyclohexyl hydroperoxide, p-menthane hydroperoxide, cyclohexanone (A) a phosphorous compound selected from the group consisting of $POCl_3$, $PCl_3$, $PCl_2R$ and $PClR_1R_2$ wherein R, $R_1$ and $R_2$ each represents a substituent selected from the class consisting of alkyl, aryl, aralkyl and cycloalkyl of 1 to 18 carbon atoms, and (B) an organic peroxide;

heating said dispersion with agitation under a substantially oxygen-free atmosphere at a temperature from about 50° C. up to about 150° C. for a period of time sufficient to enhance the oxidation resistance of said poly-α-monoolefine; and separating the poly-α-monoolefine from said dispersion.

2. A process as claimed in claim 1 wherein said organic peroxide is present in an amount of at least 0.001% by weight, with reference to the poly-α-monoolefine.

3. A process as claimed in claim 1 wherein said phosphorous compound is present in an amount of about 0.1 to 1% by weight, with reference to the poly-α-monoolefine.

4. A process as claimed in claim 3 wherein said organic peroxide is present in an amount of about 0.01 to 0.1% by weight, with reference to the poly-α-monoolefine.

5. A process as claimed in claim 1 wherein said dispersion is heated for a period of about 30 minutes up to about 5 hours.

6. A process as claimed in claim 1 wherein said dispersion is heated at a temperature of about 60° C. to 120° C.

7. A process as claimed in claim 1 wherein said phosphorous compound is $POCl_3$.

8. A process as claimed in claim 1 wherein said phosphorous compound is $PCl_3$.

9. A process as claimed in claim 1 wherein said phosphorous compound is lauryl-$PCl_2$.

10. A process as claimed in claim 1 wherein said phosphorous compound is dilauryl-PCl.

11. A process as claimed in claim 1 wherein said phosphorous compound is diphenyl-PCl.

12. A process as claimed in claim 1 wherein said phosphorous compound is benzyl-$PCl_2$.

13. A process as claimed in claim 1 wherein said dispersion is heated for about 30 minutes to 5 hours in the presence of about 0.01 to 1% by weight each of said phosphorous compound and said organic peroxide, at a temperature of about 50° C. to 150° C., and the poly-α-monoolefine is separated from the dispersion and washed with said inert hydrocarbon liquid.

14. A process as claimed in claim 13 wherein said poly-α-monoolefine is polypropylene.

15. A process as claimed in claim 13 wherein said poly-α-monoolefine is poly-4-methylpentene-1.

16. The stabilized poly-α-monoolefine product obtained by the process of claim 1.

17. The stabilized poly-α-monoolefine product obtained by the process of claim 13.

References Cited

UNITED STATES PATENTS

| | | | |
|---|---|---|---|
| 2,811,514 | 10/1957 | Hagemeyer | 260—94.9 |
| 2,829,137 | 4/1958 | Yolles | 260—94.9 |
| 3,008,939 | 11/1961 | Schroeder et al. | 260—88.2 |

FOREIGN PATENTS 838,745  6/1960  Great Britain.

DONALD E. CZAJA, *Primary Examiner.*

M. J. WELSH, *Assistant Examiner.*

UNITED STATES PATENT OFFICE
CERTIFICATE OF CORRECTION

Patent No. 3,356,639                          December 5, 1967

Gerhard Meyer et al.

It is certified that error appears in the above identified patent and that said Letters Patent are hereby corrected as shown below:

Column 3, line 8, "porduct" should read -- product --; line 66, "chloride." should read -- chloride, --. Column 4, line 10, "methylethyletoneperoxide" should read -- methylethylketoneperoxide --; line 20, "discumene" should read -- dicumene --. Column 5, line 68, "dibenzyl,phosphorous" should read -- dibenzyl phosphorous --. Column 6, lines 5 and 6, "isoproyl" should read -- isopropyl --.

Signed and sealed this 25th day of November 1969.

(SEAL)
Attest:

Edward M. Fletcher, Jr.                        WILLIAM E. SCHUYLER, JR.
Attesting Officer                                    Commissioner of Patents